No. 662,194. Patented Nov. 20, 1900.
J. JELEN.
RIDING SULKY CULTIVATOR.
(Application filed Aug. 3, 1900.)
(No Model.) 2 Sheets—Sheet 1.

Witnesses
Howard D. Orr.
J. W. Garner

Josef Jelen, Inventor,
By his Attorneys,
C. A. Snow & Co.

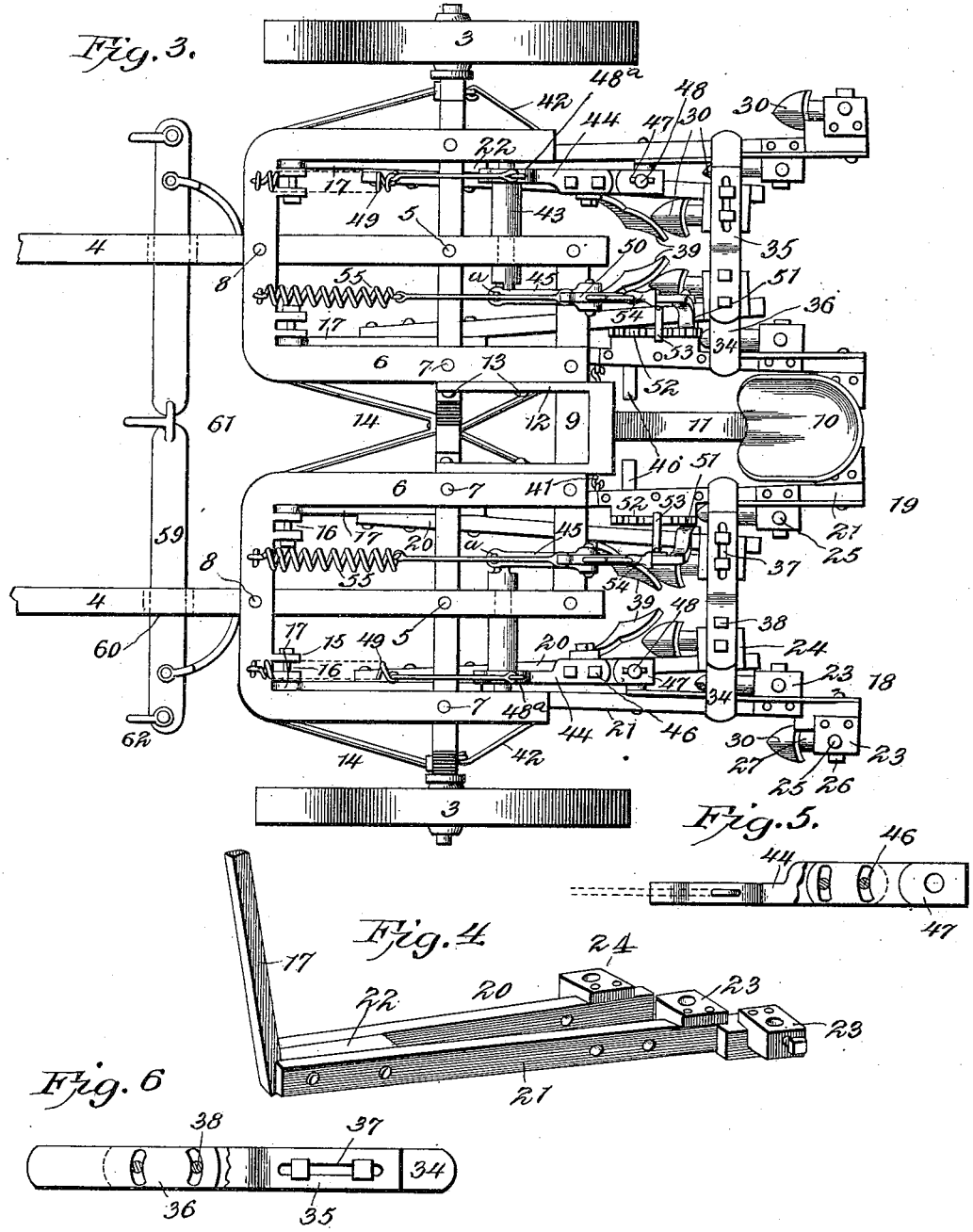

UNITED STATES PATENT OFFICE.

JOSEF JELEN, OF NORFOLK, NEBRASKA.

RIDING SULKY-CULTIVATOR.

SPECIFICATION forming part of Letters Patent No. 662,194, dated November 20, 1900.

Application filed August 3, 1900. Serial No. 25,812. (No model.)

*To all whom it may concern:*

Be it known that I, JOSEF JELEN, a citizen of the United States, residing at Norfolk, in the county of Madison and State of Nebraska, have invented a new and useful Riding Sulky-Cultivator, of which the following is a specification.

My invention is an improved riding sulky-cultivator, the object of my invention being to provide an efficient riding sulky-cultivator which is adapted for the lateral adjustment of the plow-beams, whereby the cultivating-shovels attached thereto may be caused to operate at any desired distance apart, according to the width between the rows, and whereby the plow-beams may be raised and lowered and the shovels set at any required angle on the standards.

My invention consists in the peculiar construction and combination of devices hereinafter fully set forth, and pointed out in the claims.

Figure 1:
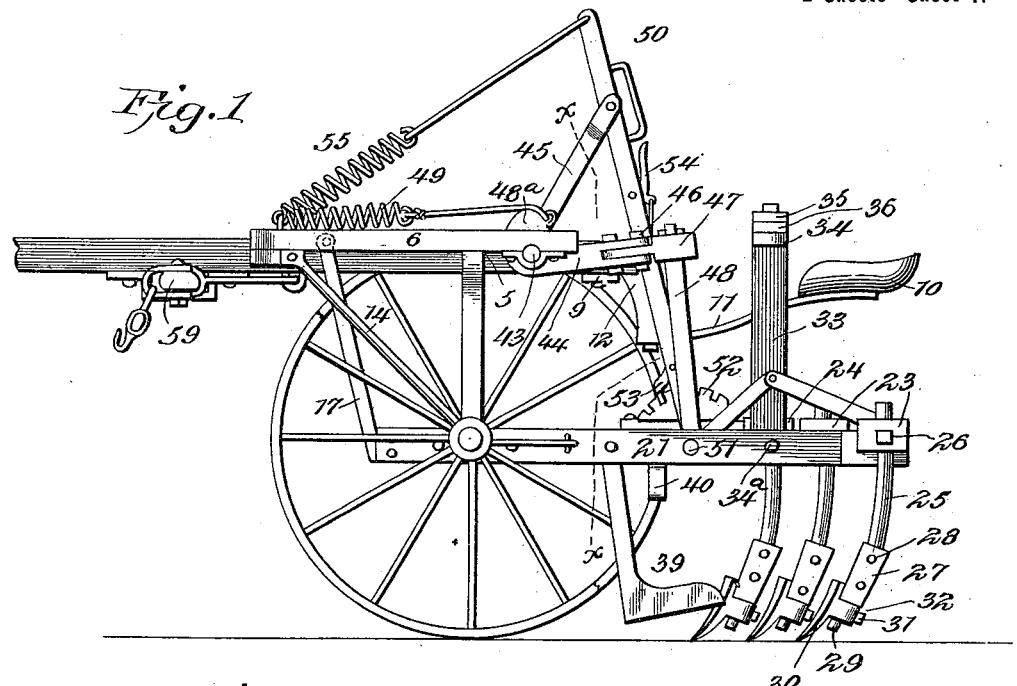
Figure 2:
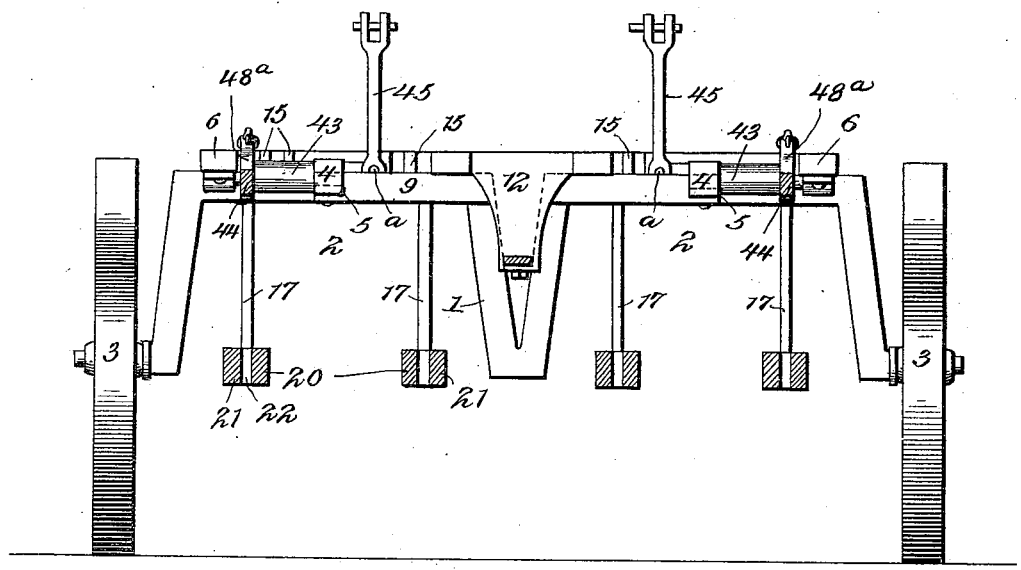

In the accompanying drawings, Figure 1 is a side elevation of a riding sulky-cultivator embodying my improvements. Fig. 2 is a vertical transverse sectional view of the same, taken on the line *x x* of Fig. 1. Fig. 3 is a top plan view of the same. Fig. 4 is a detail perspective view of one of the divided plow-beams. Fig. 5 is a detail view of a flexible connection between one of the rock-arms and one of the plow-beams. Fig. 6 is a similar view of a flexible connection between a pair of the plow-beams.

The axle 1 is of the form shown in Fig. 2 and provided with the pair of arches 2 and with the supporting-wheels 3, which are journaled on projecting spindles on the ends of the axle. A pair of draft-tongues 4 are secured near their rear ends on the centers of the arched portions of the axle, as at 5, and are also secured to the front ends of horizontally-disposed U-shaped frames 6, which are bolted on the arches of the axle, as at 7, bolts 8 securing the front portions of said U-shaped frames to the said tongues, as shown. A cross-bar 9 is bolted to the rear end of the draft-tongues and to the inner arms of said U-shaped frame 6 at the said rear ends of the inner arms.

The seat 10 for the driver is provided with a supporting spring-bar 11, the front end of which is secured in any suitable manner to a forked frame 12, the arms of the said forked frame being disposed between the inner arms of the U-shaped frame 6 and bolted thereto, as at 13. The said frame 12 also rests upon the cross-bar 9, as shown, and the latter, hence, serves to in part sustain and support the said frame 12 and the driver's seat. Brace-rods 14 connect the depending portions of the axle with the U-shaped frames 6, as shown.

The U-shaped frames 6 are provided on the rear sides of their transverse front portions at the outer corners thereof with rearward-projecting ears 15, between which and the proximate outer sides of said frames are formed recesses or openings 16, adapted to receive the upper ends of trail and supporting arms 17, which are attached to the front ends of the plow-beams, as presently described. Said trail and supporting arms are provided at their upper ends with transverse bolt-holes, and when the same are inserted in the openings or recesses 16 pivotal coupling-bolts 17, which are fitted in transversely-disposed openings in the ears 15, pass through said openings in said trail and supporting arms and hence serve to pivotally connect the front ends of the plow-beams to the frame, as will be readily understood.

The plow-beams 18 19 are disposed in pairs connected together, as hereinafter described, so that they may be raised and lowered in unison, and each of the said plow-beams is divided and composed of a pair of sectional members 20 21, the members 20 being disposed on the inner sides of the members 21 and being somewhat shorter than said latter members, and said members 20 21 have their front ends bolted to rearward-extending heel portions 22 of the supporting and trail arms 17.

To opposite sides of the beam-section 21 are bolted bracket-blocks 23, and to the inner sides of the beam-sections 20 are bolted bracket-blocks 24, one of said blocks being secured to each of said beam-sections 20, while a pair of the blocks 23 are secured to each of the beam-sections 21. It will be observed by reference to the drawings that the blocks 23 24 of the respective beams are disposed in an oblique line on each of the said beams, so that the standards 25 of the cultivating-shovels, which standards pass through vertical openings in said bracket-blocks and are secured therein at any desired vertical adjustment by means of clamping-bolts 26, are disposed one behind the other, as shown in Fig. 1.

The standards 25 are provided at their lower ends with shoes 27, which are secured thereto by bolts 28, the lower ends of the standards being inserted in recesses in the rear sides of the said shoes and the latter being provided at their lower ends with downwardly-projecting spindles 29. The cultivating-shovels 30, which may be of any desired size and form, are provided on their rear sides with bearings 31 for the said spindles 29, said cultivating-shovels being thereby pivoted on said spindles and adapted to be turned thereon at any required angle, either directly in advance of the standards or disposed obliquely on either side thereof, as may be required, and the said bearings 31 are further provided with set-bolts 32, which by being turned so as to engage and clamp the said spindles 29 are adapted to rigidly secure the said shovels on said spindles and hence to the said standards 25, as will be understood.

Vertical arms 33 have their lower ends secured between the sections 20 21 of the respective plow-beams by means of bolts 34ª or in any other suitable manner, and the upper ends of the said vertical arms 33 are connected together in pairs by means of horizontally-disposed arms 34 and link-sections 35 36, which serve to connect the said arms 34 together, and thereby connect the plow-beams together in pairs, one of said link-sections being longitudinally adjustable on one of said arms, as at 37, and the other being pivotally connected thereto, as at 38. Hence the said link-sections constitute a flexible and expansible connection between the plow-beams to connect the latter together in pairs and adapt them to be spaced apart, as may be required, and disposed obliquely with relation to each other.

To the inner sides of the inner sections 20 of the divided plow-beams are bolted fender-wings 39, which serve to guard and fend the growing plants and prevent them from being covered by the earth thrown up by the cultivating-shovels and to the plow-beams, which are proximate to the driver's seat, and on opposite sides thereof are secured stirrups 40 for the feet of the driver.

The inner pair of plow-beams are connected together by jointed rods or chains 41, and the outer plow-beams are connected to the outer portions of the axle by jointed rods or chains 42, the function of the said jointed rods or chains 41 42 being to prevent lateral swaying of the plow-beams, as will be understood.

Rock-shafts 43 are journaled in bearings in the outer sides of the U-shaped frames 6 and in the draft-tongues in rear of the axle, and said rock-shafts are each provided with rock-arms 44, said rock-arms being disposed at and rigid on the outer ends of said rock-shafts, and to the inner ends of said rock-shafts, as at a, are pivotally connected rock-arms 45, which are disposed at a suitable angle with relation to the rock-arms 44. The latter are flexibly connected, as at 46, to arms 47 at the upper ends of vertical standards 48, which rise from the outer plow-beams, the lower ends of said vertical standards being bolted or otherwise suitably secured between the sections 20 21 of said outer plow-beams. The said rock-arms 44 are provided with angle extensions 48ª, which are connected to the front sides of the U-shaped frame 6 by means of coiled retractile springs 49, or any other suitable form of spring may be employed at will, the function of the said springs being to raise the outer plow-beams normally so as to disengage their cultivating-shovels from the ground. Levers 50 are pivotally connected to the outer ends of the rock-arms 45, and the lower ends of said levers are pivotally connected to the inner plow-beams, as at 51. Said inner plow-beams are further provided with sector-shaped rack-plates 52, which are engaged by pivoted detents 53, with which said levers 50 are provided and which serve to lock the said levers to said sector-shaped plates at any required angle. Said detents are connected to and adapted to be operated by trip devices 54 of usual form, with which the levers 50 are provided, and the upper ends of said levers are connected to the front sides of the U-shaped frames 6 by means of coiled retractile springs 55. The tendency of the springs 55 and the springs 49, the latter being directly connected to the rock-arms 44 and the former indirectly connected to the rock-arms 45 through the levers 50, is to raise the plow-beams, the standards 48 and arms 47 forming the connections between the outer plow-beams to the arms 44, carried by the rock-shafts, and the levers 50 forming the connections between the inner plow-beams and the rock-arms 45, carried by the rock-shafts, and hence when the detents 53 are tripped and disengaged from the sector-shaped plates 52 the driver by means of the levers 50 may readily raise the plow-beams, the springs contributing to raise the same or, if they are sufficiently strong, entirely raising the same. By drawing rearward on said levers 50 the rock-arms 44 45 are depressed by turning the rock-shafts 43, thereby lowering the rear ends of the plow-beams, and the latter may be set at any required adjustment by means of the detent 53 and sector-shaped rack-plate 52, as hereinbefore described.

Doubletrees 59 are pivotally connected to the draft-tongues by means of the bolts 60, the pivotal points of said doubletrees being out of the centers thereof, the longer portions of said doubletrees being within said pivotal points between the draft-tongues, and the shorter portions thereof being on the outer side of the draft-tongues. The inner ends of the doubletrees are connected together by a link 61, which serves also for the attachment of a singletree for a draft-animal to be disposed between the draft-tongues, and the outer ends of the said doubletrees are provided with the usual clip-bolts or other suitable devices 62 for the attachment of singletrees for draft-animals disposed on the outer sides of the draft-tongues.

Having thus described my invention, I claim—

1. In a sulky plow or cultivator, the combination of a draft-frame, a rock-shaft mounted thereon, and having the rock-arm, a plow-beam connected at its front end to said frame, a link-lever connected at its lower end to said plow-beam and connected near its upper end to said rock-arm, a spring connected to and drawing forward on the upper end of the said link-lever and tending to raise the rear end of said plow-beam, and a spring connected to said rock-shaft, tending to partly rotate the same and also tending to raise the rear end of the plow-beam, substantially as described.

2. The combination in a sulky-cultivator, of a draft-frame, a rock-shaft mounted thereon, a rock-arm rigid on said rock-shaft, a rock-arm pivotally secured to said rock-shaft, a pair of plow-beams having their front ends connected flexibly to said draft-frame, said plow-beams being flexibly connected together near their rear ends, a flexible connection between one of the plow-beams and the rigid rock-arm on the rock-shaft, a link-lever connected to the other plow-beam and to the rock-arm which is pivotally secured to the rock-shaft, and a spring connected to and drawing forward on the upper portion of said link-lever, substantially as described.

3. The combination in a sulky-cultivator, of a draft-frame, a rock-shaft mounted thereon, a rock-arm rigid on said rock-shaft, a rock-arm pivotally secured to said rock-shaft, a pair of plow-beams having their front ends flexibly connected to said draft-frame, said plow-beams being flexibly connected together, near their rear ends, a flexible connection between one of the plow-beams and the rigid rock-arm on the rock-shaft, and a link-lever connected to the other plow-beam and to the rock-arm which is pivotally secured to the rock-shaft, substantially as described.

In testimony that I claim the foregoing as my own I have hereto affixed my signature in the presence of two witnesses.

JOSEF JELEN.

Witnesses:
 JAKE KOENIGSTEIN,
 S. L. GARDNER.